(12) United States Patent
Hirabayashi et al.

(10) Patent No.: US 10,071,781 B2
(45) Date of Patent: Sep. 11, 2018

(54) INVERTED PENDULUM VEHICLE

(71) Applicant: HONDA MOTOR CO., LTD., Tokyo (JP)

(72) Inventors: Yutaka Hirabayashi, Wako (JP); Makoto Hasegawa, Wako (JP); Hokuto Kanda, Wako (JP); Tomokazu Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/819,782

(22) Filed: Nov. 21, 2017

(65) Prior Publication Data

US 2018/0148115 A1     May 31, 2018

(30) Foreign Application Priority Data

Nov. 28, 2016    (JP) ................. 2016-230115

(51) Int. Cl.
    *B62J 6/00*      (2006.01)
    *B62K 11/00*      (2006.01)
    *B62J 25/00*      (2006.01)

(52) U.S. Cl.
    CPC ............ *B62J 6/005* (2013.01); *B62J 25/00* (2013.01); *B62K 11/007* (2016.11); *B62J 2006/006* (2013.01)

(58) Field of Classification Search
None
See application file for complete search history.

(56) References Cited

U.S. PATENT DOCUMENTS

| | | | | |
|---|---|---|---|---|
| 2010/0057319 A1* | 3/2010 | Inaji | ..................... | G05D 1/0891 701/70 |
| 2010/0299044 A1* | 11/2010 | Miyake | ................ | B62K 11/007 701/96 |
| 2011/0010066 A1* | 1/2011 | Fuwa | ................... | B62K 11/007 701/70 |
| 2011/0067939 A1* | 3/2011 | Takenaka | ................. | B62K 1/00 180/21 |
| 2012/0035809 A1* | 2/2012 | Kosaka | ................... | A63C 17/12 701/41 |
| 2012/0123647 A1* | 5/2012 | Doi | ......................... | B60L 15/20 701/49 |
| 2012/0268958 A1* | 10/2012 | Kasaba | ..................... | B60Q 1/10 362/466 |
| 2014/0353051 A1 | 12/2014 | Yada et al. | | |

FOREIGN PATENT DOCUMENTS

JP      2005335570 A     12/2005
JP      2014234036 A     12/2014

* cited by examiner

*Primary Examiner* — Kristy A Haupt
(74) *Attorney, Agent, or Firm* — Armstrong Teasdale LLP

(57) ABSTRACT

An inverted pendulum vehicle 10 is provided with a display unit 70 for illuminating a floor surface 110 surrounding a vehicle body thereof, and a display control unit 87 for controlling an illumination pattern of the display unit according to an inclination angle detected by an inclination detection unit 66, 81.

7 Claims, 10 Drawing Sheets

*Fig.8*

|  | RF | RM | RR | LR | LM | LF |
|---|---|---|---|---|---|---|
| stop | out (low) | out (low) | out (low) | out (low) | out (low) | out (low) |
| forward | high | low | out | out | low | high |
| rearward | out | low | high | high | low | out |
| right turn | high | low | out | out | out | low |
| left turn | low | out | out | out | low | high |
| right sideways | low | high | low | out | out | out |
| left sideways | out | out | out | low | high | low |

INVERTED PENDULUM VEHICLE

TECHNICAL FIELD

The present invention relates to an inverted pendulum vehicle, and in particular to an inverted pendulum vehicle provided with an arrangement for optically announcing the traveling direction and the presence of the vehicle to people in proximity.

BACKGROUND ART

An inverted pendulum vehicle can travel freely with a small foot print, and is therefore suitable to be used in environments where pedestrians may be present. See JP2014-234036A, for example. It is therefore desirable for such an inverted pendulum vehicle to be provided with indicators for indicating the traveling direction and other states of the vehicle to the pedestrians in the vicinity of the vehicle. JP2005-335570A discloses an inverted pendulum vehicle provided with indicator lamps indicating the traveling directions and turning directions of the vehicle.

Because an inverted pendulum vehicle typically has a small height, a headlamp or a rear lamp is not highly visible to a pedestrian standing adjacent to the vehicle. Also, the light emitted from the vehicle may be obstructed by a pedestrian standing in the line of sight of the viewer. If an indicator lamp having a low intensity is used, the light from the lamp may not be visible to pedestrians. If an indicator lamp having a high intensity is used, the light from the lamp may annoy pedestrians.

SUMMARY OF THE INVENTION

In view of such problems of the prior art, a primary object of the present invention is to provide an inverted pendulum vehicle provided with an indicator device which does not annoy the viewer, and has a good visibility.

To achieve such an object, the present invention provides an inverted pendulum vehicle, comprising; a vehicle body (12, 20); an inclination detection unit (66, 81) for detecting an inclination angle of the vehicle body; a propulsion unit (42) for propelling the vehicle body; a drive control unit (85) for controlling the propulsion unit so as to maintain an upright attitude of the vehicle body according to the inclination angle detected by the inclination detection unit; a display unit (70) for illuminating a floor surface (110) surrounding the vehicle body; and a display control unit (87) for controlling an illumination pattern of the display unit according to the inclination angle detected by the inclination detection unit.

Because the information or the message is indicated by the illumination pattern on the floor surface surrounding the vehicle body, the light emitted from the display unit is indirectly viewed by the viewer in a pleasing manner. Also, because a relatively large area of the floor surface is illuminated by the light emitted from the display unit, the viewer is enabled to view the illumination pattern without being obstructed by an object or a person located or standing near the vehicle.

Typically, the illumination pattern indicates a travel direction of the vehicle.

Thereby, a person standing near the vehicle is warned of the movement of the vehicle in an unobtrusive but highly visible manner.

Preferably, the travel direction is indicated by a larger area or a greater intensity of an illuminated part of the illumination pattern.

Thereby, a person standing near the vehicle is warned of the movement of the vehicle in a highly intuitive manner.

Preferably, the display unit includes a plurality of discrete light emitting elements, and the illumination pattern is formed by selectively activating a part of the light emitting elements.

Thereby, various messages can be conveyed via a movement of light without requiring any moving parts.

Preferably, each light emitting element is configured to illuminate a prescribed segment of the illumination pattern, and the illumination pattern is formed by combining the segments illuminated by the individual light emitting elements.

Thereby, desired illumination patterns can be freely created so as to enhance the visibility and the attractiveness of the illumination patterns.

The display unit may be configured to illuminate the floor surface surrounding the vehicle body substantially over an entire periphery of the vehicle body.

Thereby, the visibility of the illumination pattern can be maximized.

According to a preferred embodiment of the present invention, the vehicle body is provided with a pair of footrests for a rider of the vehicle, and the display unit is provided on a lower surface of each footrest.

Thereby, the light emitted from the display unit is prevented from directly reaching the eyes of the viewer so that the viewer can recognize the illumination pattern in a pleasant way.

Thus, the present invention provides an indicator device for an inverted pendulum vehicle which does not annoy the viewer, and has a good visibility.

BRIEF DESCRIPTION OF THE DRAWINGS

FIG. 8 is a table showing different illumination patterns;

DESCRIPTION OF THE PREFERRED EMBODIMENT(S)

A first embodiment of the present invention is described in the following with reference to FIGS. 1 to 9.

Figure 1:
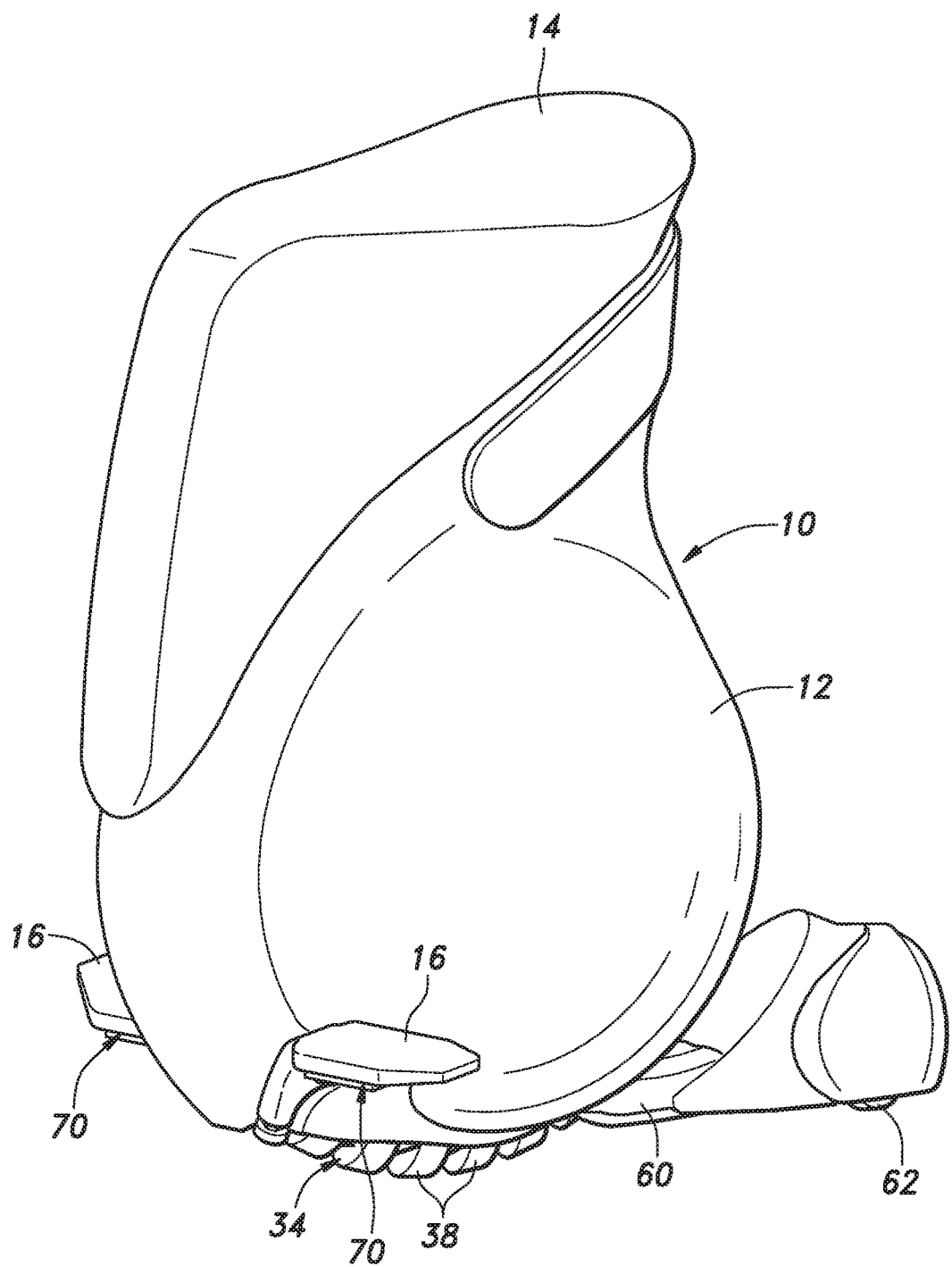
FIG. 1 is a perspective view of an inverted pendulum vehicle according to a first embodiment of the present invention.
Figure 2:
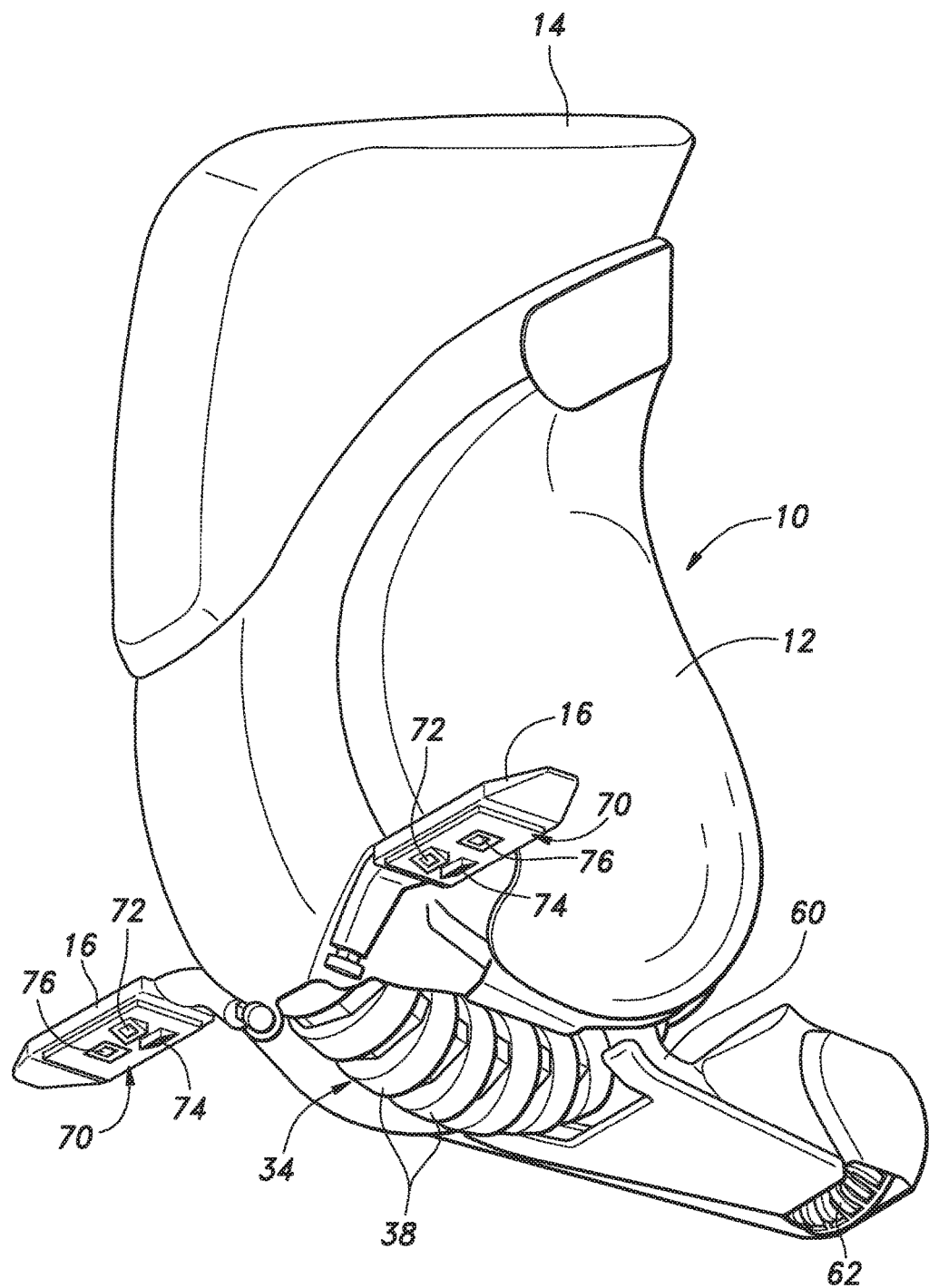
FIG. 2 is a perspective view of the inverted pendulum vehicle viewed from a lower direction to show the details of a main wheel.

As shown in FIGS. 1 and 2, an inverted pendulum vehicle 10 of the first embodiment is provided with a vehicle body structure 20 covered by an outer shell 12, and a saddle 14 is provided on an upper end of the outer shell 12 for seating a rider. A pair of footrests 16 project laterally from either side of lower parts of the outer shell 12. In the following disclosure, the assembly of the vehicle body structure 20, the outer shell 12, the saddle 14 and the footrests 16 is referred to as the vehicle body of the inverted pendulum vehicle 10.

Figure 3:
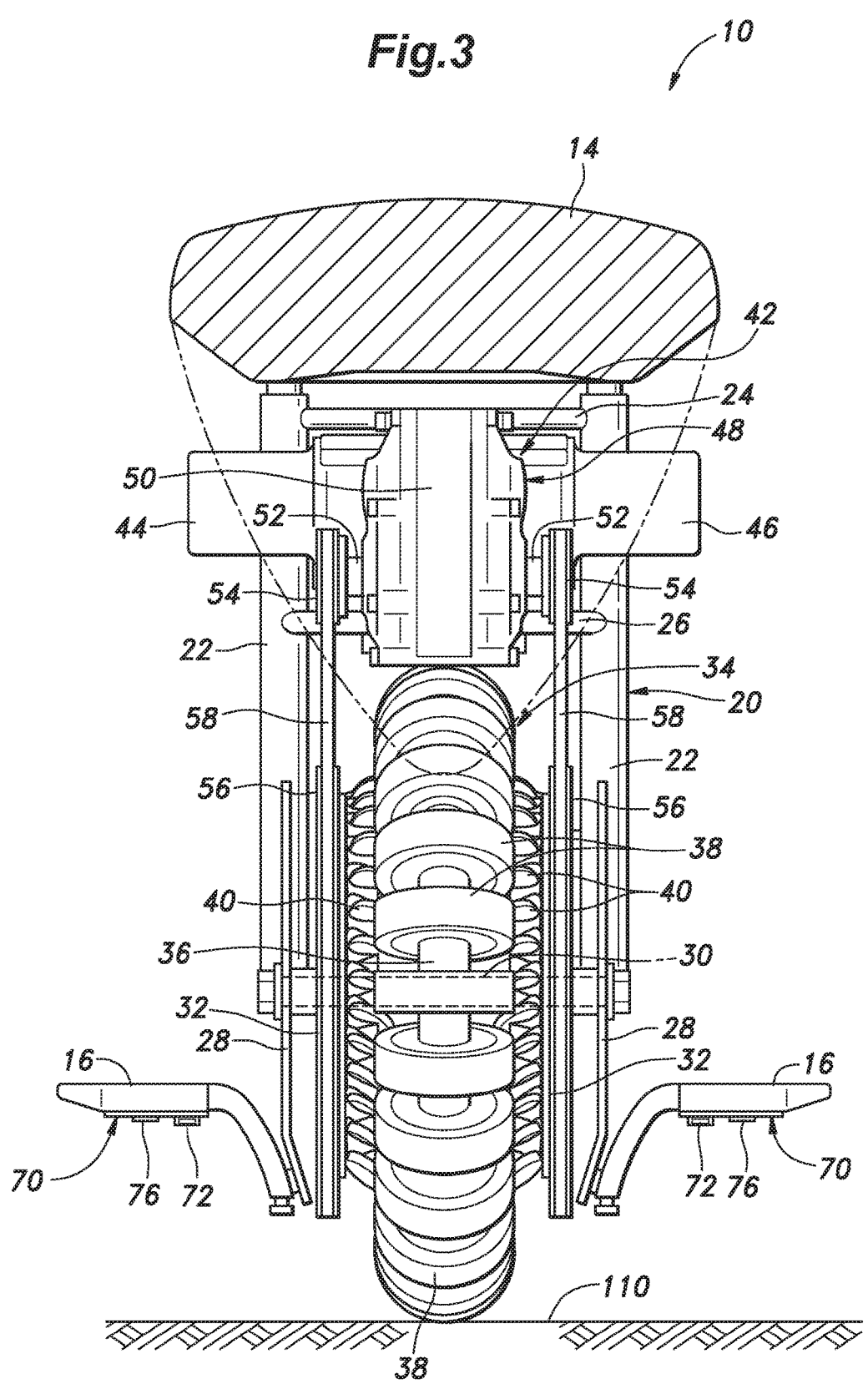
FIG. 3 is a front view of the inverted pendulum vehicle with an outer shell removed.
Figure 4:
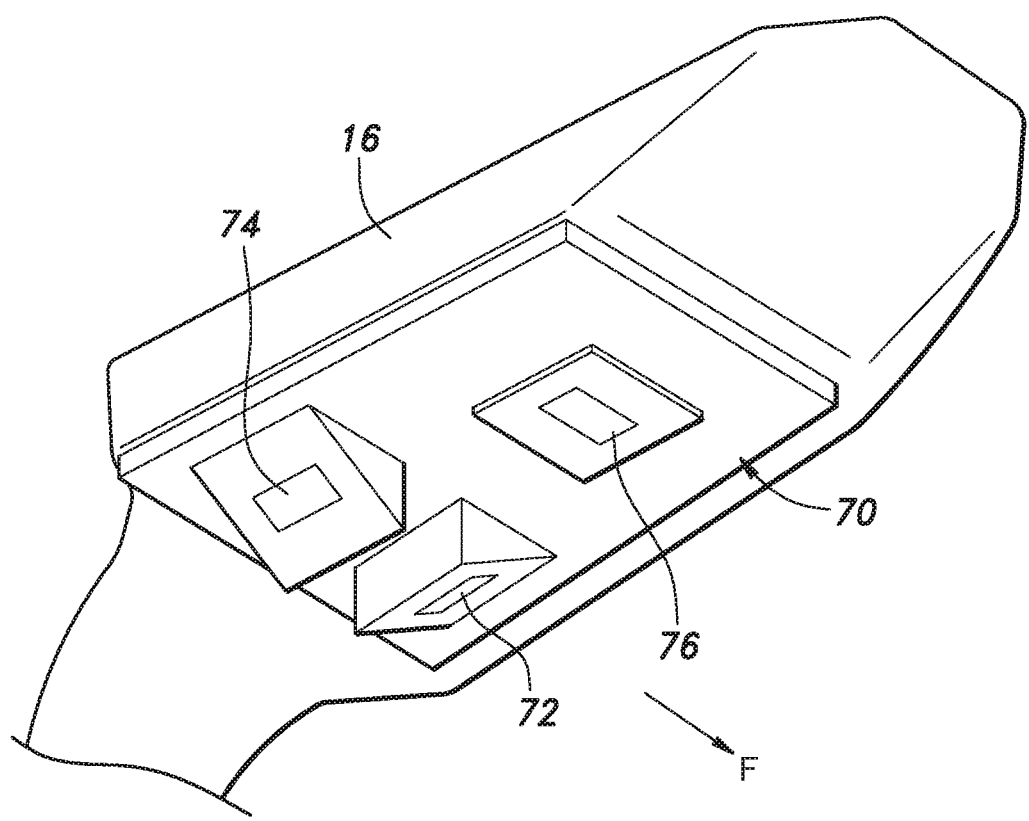
FIG. 4 is a fragmentary perspective view of a footrest of the inverted pendulum vehicle.
Figure 5:
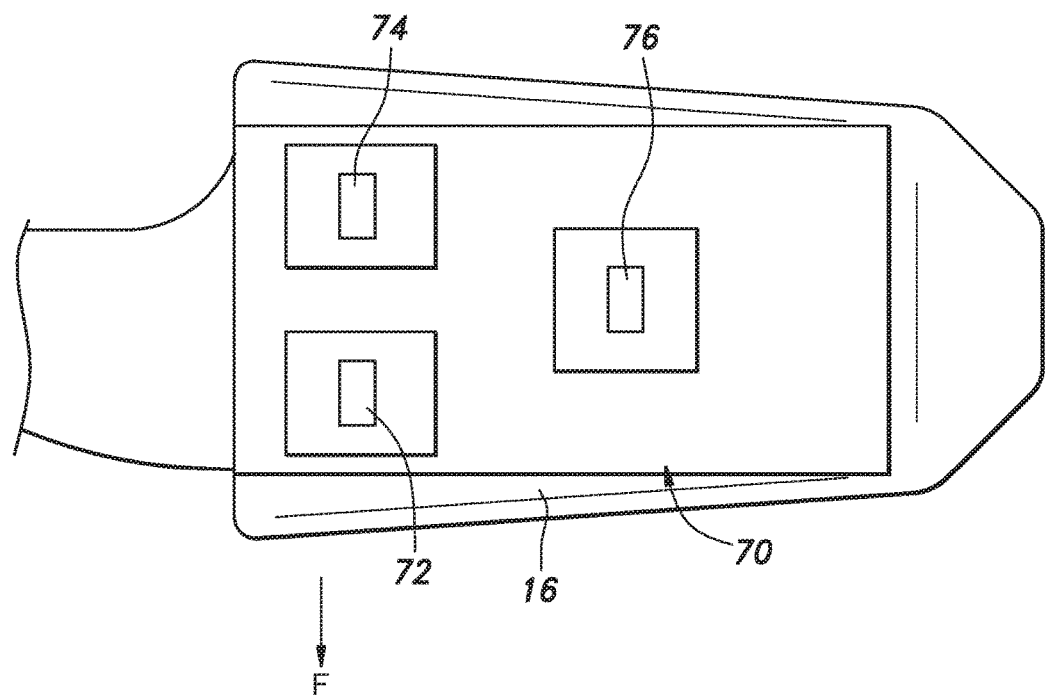
FIG. 5 is a fragmentary bottom view of the footrest of the inverted pendulum vehicle.

As shown in FIG. 3, the vehicle body structure 20 includes a pair of side posts 22 extending vertically, an upper beam 24 and a middle beam 26 extending laterally and connected between the side posts 22, a pair of side plate 28 attached to lower pairs of the respective side posts 22. The saddle 14 is attached to upper ends of the side posts 22. A footrest 16 is attached to a lower part of each side plate 28.

The side plates 28 support two ends of a disk support shaft 30 extending horizontally in the vehicle width direction (lateral direction) between the left and right side plates 28. The disk support shaft 30 supports a pair of drive disks 32 in an individually rotatable manner in a space defined between the two side plates 28.

A main wheel 34 is disposed between the two drive disks 32. The main wheel 34 is provided with a metallic annular member 36, and a plurality of driven rollers 38 arranged along the annular member 36 and rotatably supported by the annular member 36 in an individually and freely rotatable manner around the tangential lines of the annular member 36.

Each drive disk 32 rotatably supports a plurality of drive rollers 40 along a circumferential direction at a regular interval. The drive rollers 40 of the two drive disks 32 are arranged in a mirror image of each other, and are individually and freely rotatable around respective rotational center lines which are in a skewed relationship to the rotational center line of the drive disks 32.

The drive rollers 40 are in contact with the driven rollers 38 so that the main wheel 34 is interposed between the drive disks 32. The main wheel 34 is not supported by any fixed shaft, but solely by means of the contact between the drive rollers 40 and the driven rollers 38.

The vehicle body structure 20 fixedly supports a drive unit 42 which includes a pair of electric motors 44 and 46 and a speed reduction unit 48. The output shafts of the electric motors 44 and 46 are coupled to the speed reduction unit 48, and two output shafts 52 of the speed reduction unit 48 project laterally from either side of the speed reduction unit 48. The rotational outputs of the two electric motors 44 and 46 are transmitted to the respective output shafts 52 of the speed reduction unit 48 at a reduced speed.

A drive pulley 54 is attached to each output shaft 52 of the speed reduction unit 48, and a driven pulley 56 is attached to each drive disk 32. An endless cogged belt 58 is passed around each drive pulley 54 and the corresponding driven pulley 56 so that the two drive disks 32 can be individually driven at speeds that correspond to the rotational speeds of the respective electric motors 44 and 46.

A tail wheel arm 60 is connected to a lower rear end part of the vehicle body structure 20 at a base end thereof via a pivot pin extending in the lateral direction. A rear end or the free end of the tail wheel arm 60 supports an omni-wheel which has a primary wheel rotatable around a rotational center line extending in the fore and aft direction and a plurality of secondary wheels supported along the outer periphery of the primary wheels so as to be freely rotatable around rotational center lines extending in the tangential directions of the primary wheel. The free end of the tail wheel arm 60 is additionally fitted with a tail wheel electric motor 65 (FIG. 7) to rotatively drive the primary wheel.

As shown in FIGS. 1 to 6, each footrest 16 includes a base arm extending laterally and upward, and a plate member having a horizontal major plane and attached to the free end of the base arm. A lamp unit 70 is attached to the lower surface of the plate member of each footrest 16. The lamp unit 70 is provided with a front LED 72, a rear LED 74, and a side LED 76. The front LED 72 is positioned on a slanted surface of a projection projecting downward from an inner and front end part of the lower surface of the footrest 16. The slanted surface faces a downward and forward direction. The rear LED 74 is positioned on a slanted surface of a projection projecting downward from an inner and rear end part of the lower surface of the footrest 16. The slanted surface faces a downward and rearward direction. The side LED 76 is positioned on a laterally outer and longitudinally middle part of the horizontal lower surface of the plate member of the footrest 16. Thus, the front LED 72 emits light in a forward and downward direction, and the rear LED 74 emits light in a rearward and downward direction. The side LED 76 emits light in a downward direction.

In the following disclosure, the front LED 72, the rear LED 74 and the side LED 76 of the right lamp unit 70 is referred to "RF", "RR" and "RM", respectively, and the rear LED 72, the rear LED 74 and the side LED 76 of the left lamp unit 70 is referred to "LF", "LR" and "LM", respectively.

Figure 6:
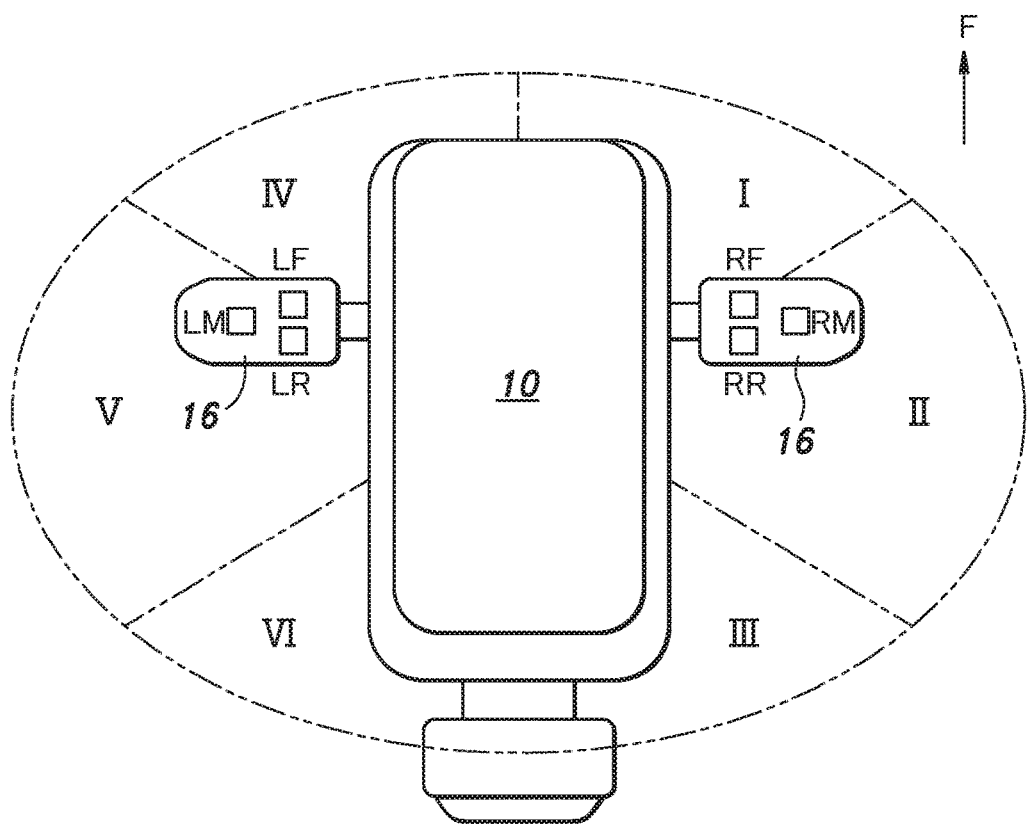
FIG. 6 is a plan view showing an illumination pattern on a floor surface surrounding the inverted pendulum vehicle.

As shown in FIG. 6, the RF, RM, RR, LF, LM and LR are configured to illuminate six sections of a circular or elliptic region of the floor surface 110 around the vehicle 10. Thus, each LED is configured to illuminate a sector shaped area. In the illustrated embodiment, the illuminated region consists of a laterally elongated ellipse.

Since each lamp unit 70 is arranged on the lower bottom surface of the corresponding footrest 16 which is close to the floor surface 110, the light emitting surfaces of the RF, RM, RR, LF, LM and LR are not directly visible to the rider of the vehicle 10 or people around the vehicle 10. The light emitted from the RF, RM, RR, LF, LM and LR is visible only as light that is projected onto the floor surface 110, and is thus visible only as indirectly illuminated light by the rider and the people around the vehicle 10.

Figure 7:
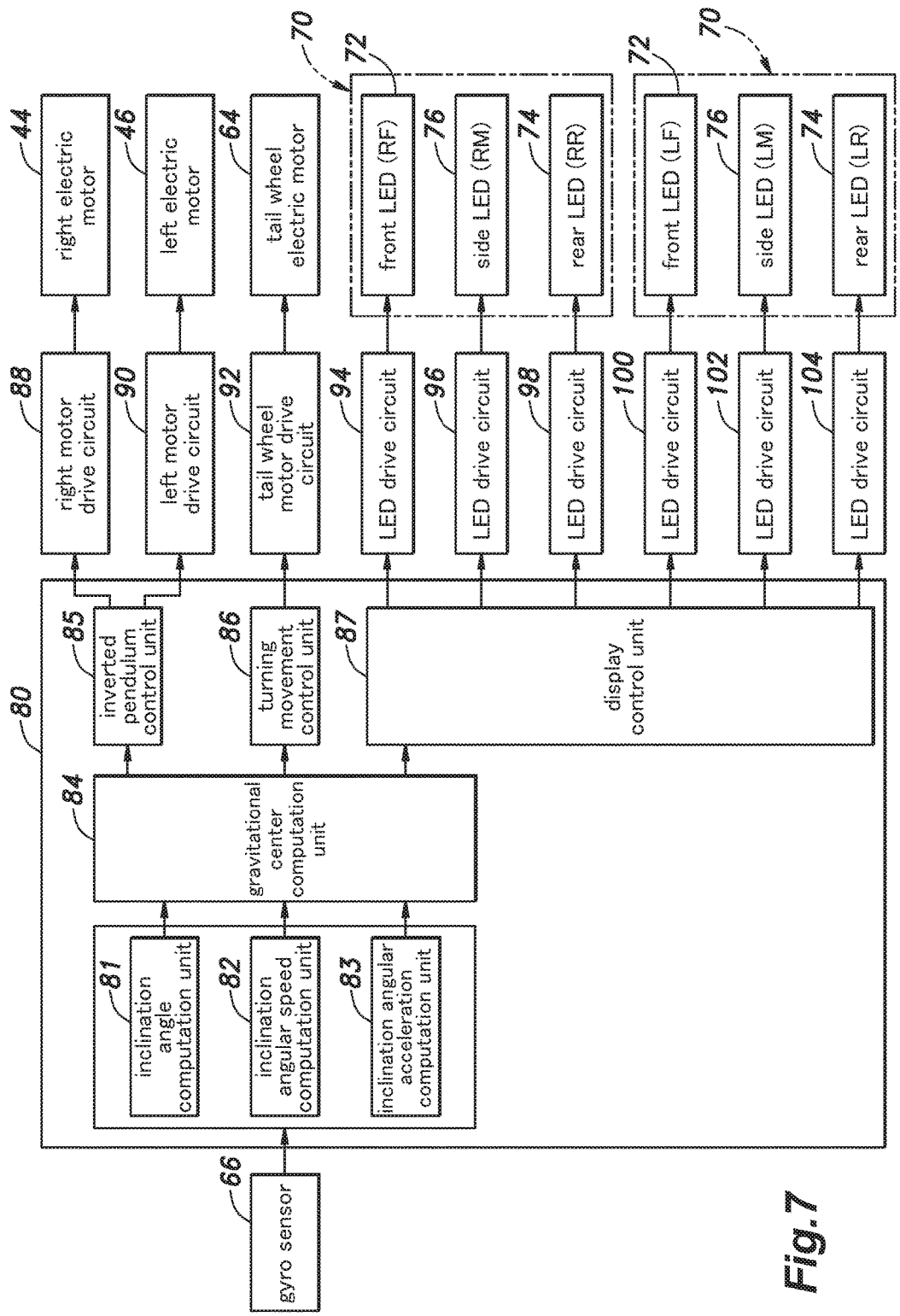
FIG. 7 is a block diagram of a control system of the inverted pendulum vehicle.

A control system 80 of the inverted pendulum vehicle 10 is described in the following with reference to FIG. 7. A gyro sensor (inclination detection unit) 66 is attached to the vehicle body structure 20. The gyro sensor 66 detects a lateral and a fore and aft inclination angle of the vehicle body with respect to the plumb vertical line of the vehicle body structure 20, and produces the detection values to a control system 80. A control system 80 essentially consists of a microcomputer. The control system 80 includes an inclination angle computation unit 81, an inclination angular velocity computation unit 82, an inclination angular acceleration computation unit 83, a gravitational center computation unit 84, an inverted pendulum control unit 85, a turning movement control unit 86, and a display control unit 87.

The inclination angle computation unit 81 computes a lateral inclination angle and a fore and aft inclination angle of the vehicle body with respect to the plumb vertical line according to the output signal (detected value) of the gyro sensor 66. The inclination angular velocity computation unit 82 computes an inclination angular velocity from the inclination angle computed by the inclination angle computation unit 81. The inclination angular acceleration computation unit 83 computes an inclination angular acceleration from the inclination angular velocity computed by the inclination angular velocity computation unit 82. The gravitational center computation unit 84 computes the center of gravity of the inverted pendulum vehicle 10 including the rider seated on the saddle 14 according to the changes in the inclination angle, inclination angular velocity, and inclination angular acceleration of the vehicle body computed by the various computation units 81 to 83.

The inverted pendulum control unit 85 performs computations required for an inverted pendulum control according to the position of the center of gravity computed by the gravitational center computation unit 84, and forwards appropriate command signals to a right motor drive circuit 88 and a left motor drive circuit 90. The turning movement control unit 86 performs computations required for a turning control according to the position of the center of gravity computed by the gravitational center computation unit 84, sets the turning direction, and forwards a command signal to a tail wheel motor drive circuit 92. Each of the motor drive circuits 88, 90 and 92 includes an inverter or the like, and is configured to control electric power to be supplied to the corresponding electric motor 44, 46, 64 from a battery (not shown in the drawings) mounted on the vehicle body structure 20.

Based on the position of the center of gravity computed by the gravitational center computation unit 84, the display control unit 87 selectively sets a light projection pattern indicating the running direction and/or the turning direction of the inverted pendulum vehicle 10, and forwards a corresponding command signal to LED drive circuits 94, 96, 98, 100, 102 and 104 provided for the respective RF, RM, RR, LF, LM and LR.

FIG. 8 shows the combination of the states of the RF, RM, RR, LF, LM and LR that are selected according to the traveling direction and turning direction of the inverted pendulum vehicle 10. The intensity of the light emitted from each of the RF, RM, RR, LF, LM, and LR is varied by adjusting the current supplied to the corresponding LED. In FIG. 8, "high" and "low" correspond to the intensity of light emitted from the corresponding LED with 80 to 100% and 40 to 60% of the maximum current for the LED, respectively. "Out" corresponds to the intensity of light emitted from the corresponding LED with 0 to 20% of the maximum current for the LED.

The mode of operation of the control system 80 in regard to the movement of the inverted pendulum vehicle 10 is described in the following.

When the center of gravity of the inverted pendulum vehicle 10 including the rider is in the neutral position, the control system 80 drives the right electric motor 44 and the left electric motor 46 according to the computation process based on an inverted pendulum control rule, and the vehicle body is kept in an upright attitude. At this time, the inverted pendulum vehicle 10 is stationary without running or turning.

Figure 9:
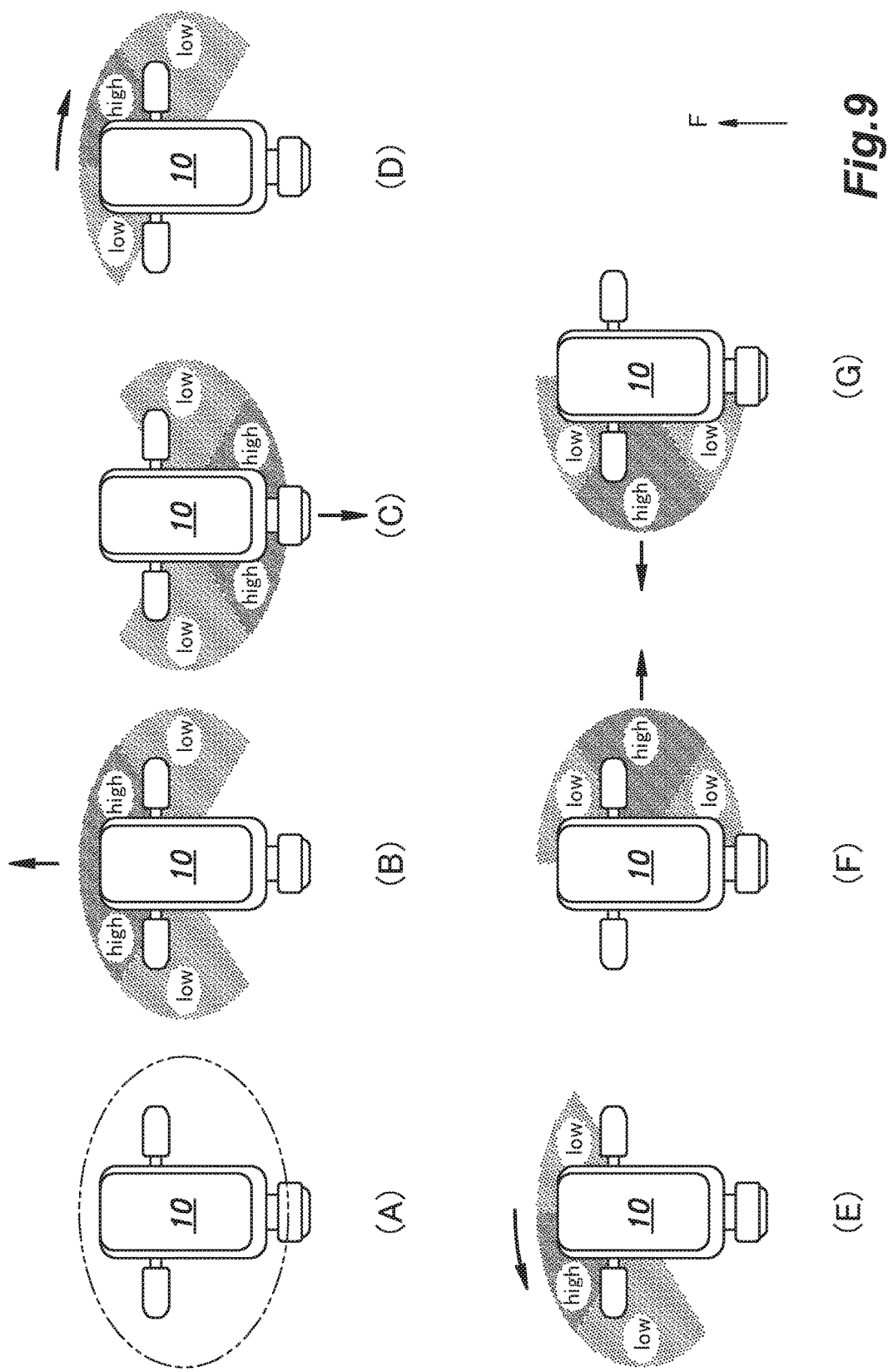
FIG. 9 is a plan view of different illumination patterns projected onto a floor surface by LEDs.

In this stationary state, all the light emission states of RF, RM, RR, LF, LM, LR are uniformly "out" or "low", and if the light emission intensity is other than 0%, the part of the floor surface 110 surrounding the vehicle 10 is illuminated faintly in an elliptic shape with the vehicle 10 at the center as indicated by the imaginary line in FIG. 9 (A). Therefore, if the light emission intensity is other than 0%, people around the inverted pendulum vehicle 10 can clearly recognize the presence of the inverted pendulum vehicle 10 from any direction, and without causing any alarm or discomfort.

When the center of gravity of the inverted pendulum vehicle 10 including the rider moves forward from the neutral position, the control system 80 controls the right electric motor 44 and the left electric motor 46 under the control process based on the inverted pendulum control rule so as to be driven in the normal rotational direction at a same speed. In this case, the right electric motor 44 and the left electric motor 46 drive the right and left drive disks 32 in the normal direction at a same speed so that the main wheel 34 rotates around the rotational center line thereof, and rolls forward. At this time, since there is no rotational speed difference between the right and left drive disks 32, the drive rollers 40 and the driven rollers 38 do not rotate, and the inverted pendulum vehicle 10 travels straight ahead. At this time, the tail wheel electric motor 64 is not driven.

During this forward traveling mode, the RF and LF are in the "high" state, and the RM and the LM are in the "low" state so that a light projection pattern indicating the forward traveling direction as shown in FIG. 9 (B) is produced.

When the center of gravity of the inverted pendulum vehicle 10 including the rider moves rearward from the neutral position, the control system 80 controls the right electric motor 44 and the left electric motor 46 under the control process based on the inverted pendulum control rule so as to be driven in the reverse rotational direction at a same speed. In this case, the right electric motor 44 and the left electric motor 46 drive the right and left drive disks 32 in the reverse direction at a same speed so that the main wheel 34 rotates around the rotational center line thereof, and rolls rearward. At this time, since there is no rotational speed difference between the right and left drive disks 32, the drive rollers 40 and the driven rollers 38 do not rotate, and the inverted pendulum vehicle 10 travels straight backward. At this time, the tail wheel electric motor 64 is not driven.

During this reverse traveling mode, the RR and LR are in the "high" state, and the RM and the LM are in the "low" state so that a light projection pattern indicating the rearward traveling direction as shown in FIG. 9 (C) is produced.

When the center of gravity of the inverted pendulum vehicle 10 including the rider moves obliquely forward either to the left or to the right, the control system 80 performs a control process based on a turning control rule, and drives the tail wheel electric motor 64 in the corresponding direction without driving the left electric motor 46 or the right electric motor 44. By driving the tail wheel electric motor 64, the tail wheel 62 rotates around the rotational center line thereof extending in the fore and aft direction. As a result, the inverted pendulum vehicle 10 turns right or left around the ground contact point of the main wheel 34 with the floor surface 110.

When the vehicle 10 is traveling obliquely forward to the right, the RF is "high", and the LF and the RM is "low" so that a light projection pattern indicating the oblique travel direction as shown in FIG. 9 (D) is produced. When the vehicle 10 is traveling obliquely forward to the left, the LF is "high", and the RF and the LM are "low" so that a light projection pattern indicating the oblique travel direction as shown in FIG. 9 (E) is produced.

When the center of gravity of the inverted pendulum vehicle 10 including the rider moves sideways to the left or to the right, the control system 80 drives the right electric motor 44 and the left electric motor 46 at a same rotational speed in different rotational directions under the control process based on the inverted pendulum control rule. At this time, the main wheel 34 does not rotate around the rotational center line thereof, and only the driven roller 38 rotates around the respective rotational center lines so that the inverted pendulum vehicle 10 travels rightward or leftward (moves sideways). At this time, the tail wheel electric motor 64 is not driven.

At the time of the rightward movement, the RM is "high", the RF and the RR are "low", and as shown in FIG. 9 (F), a light projection pattern indicating the traveling direction is produced. At the time of leftward movement, the LM is in the "high" state, the LF and the LR are in the "low" state, and as shown in FIG. 9 (G), the light projection pattern indicating the traveling direction is produced.

As discussed above, a light projection pattern is formed in accordance with the running direction or the turning direction of the inverted pendulum vehicle 10. Therefore, the people around the inverted pendulum vehicle 10 are enabled to know the running direction or the turning direction of the inverted pendulum vehicle 10 from the illuminated light pattern on the floor surface 110.

Since the indication of the running direction or the turning direction of the inverted pendulum vehicle 10 is made through indirect illumination of the floor surface 110 surrounding the inverted pendulum vehicle 10, the light emitted from the LEDs 72, 74, and 76 is less likely to be blocked by a person or the like standing in the way, and a high level of visibility can be attained.

Further, since the viewer sees the light from the LEDs as indirect illumination, even if the luminance of each LED 72, 74, 76 is high, the emitted light does not dazzle the viewers, and the emitted light is pleasing and attractive to the eyes of the viewers. Furthermore, since the intensity of the light that illuminates the floor surface 110 can be varied in a plurality of stages, and the illumination of the floor surface 110 can be effected in a plurality of patterns, a large amount of information can be conveyed to the people in the vicinity of the vehicle 10.

Since each light projection pattern is formed by lighting up a selected group of LEDs 72, 74 and 76 each with an intensity level selected from a plurality of choices (three, in the illustrated embodiment), a large amount of information can be displayed without requiring any moveable parts. As the light is projected onto the floor surface 110, a non-obtrusive but highly visible display can be achieved.

If each LED 72, 74, 76 can emit light in a plurality of colors, even more versatile display modes are possible. For instance, the color of the emitted light may be changed depending on the travel speed of the vehicle 10. Green color may be used in a low speed range, and red color may be used in a high speed range. It is also possible to turn on and off each LED, for instance, at a higher frequency with an increase in the acceleration of the vehicle 10.

Optionally, when the inverted pendulum vehicle 10 starts off, all of the RF, RM, RR, LF, LM and LR may be blinked for a certain time period. Thereby, the people around the vehicle 10 are properly warned of the movement of the vehicle 10. Also, the RF, RM, RR, LR, LM and LF may be turned on and off in that order when the vehicle is about to make a right turn, and the LF, LM, LR, RR, RM and RF may be turned on and off in that order when the vehicle is about to make a left turn so that the turning direction may be indicated by the movement of the light.

Figure 10:
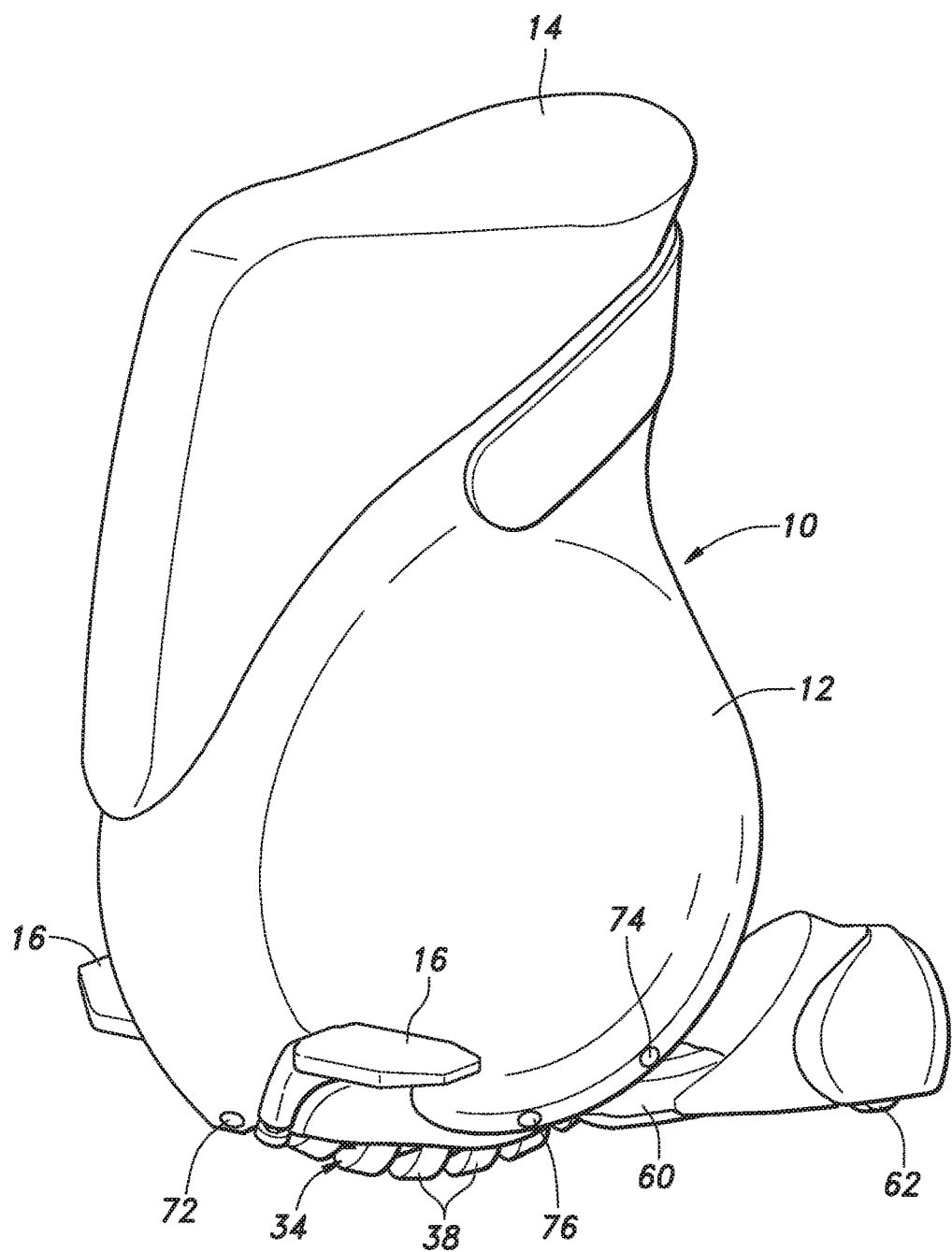
FIG. 10 is a view similar to FIG. 1 showing an inverted pendulum vehicle according to a second embodiment of the present invention.

FIG. 10 shows a second embodiment of the present invention in which the lamp units 70 are attached to lower parts of the outer shell 12, instead of the footrests 16.

Although the present invention has been described in terms of preferred embodiments thereof, it is obvious to a person skilled in the art that various alterations and modifications are possible without departing from the spirit of the present invention.

For instance, the light sources of the lamp units 70 are not limited to LEDs, but may also consist of incandescent lamps, fluorescent lamps and other light sources. Furthermore, each lamp unit 70 may be incorporated with moveable parts for changing the light emitting patterns and the light emitting directions. The lamp units may also consist of LCD projectors which can illuminate the floor surface in various patterns under the control of a computer.

The invention claimed is:

1. An inverted pendulum vehicle, comprising;
a vehicle body;
an inclination detection unit for detecting an inclination angle of the vehicle body;
a propulsion unit for propelling the vehicle body;
a drive control unit for controlling the propulsion unit so as to maintain an upright attitude of the vehicle body according to the inclination angle detected by the inclination detection unit;
a display unit for illuminating a floor surface surrounding the vehicle body; and
a display control unit for controlling an illumination pattern of the display unit according to the inclination angle detected by the inclination detection unit.

2. The inverted pendulum vehicle according to claim 1, wherein the illumination pattern indicates a travel direction of the vehicle.

3. The inverted pendulum vehicle according to claim 2, wherein the travel direction is indicated by a larger area or a greater intensity of an illuminated part of the illumination pattern.

4. The inverted pendulum vehicle according to claim 1, wherein the display unit includes a plurality of discrete light emitting elements, and the illumination pattern is formed by selectively activating a part of the light emitting elements.

5. The inverted pendulum vehicle according to claim 4, wherein each light emitting element is configured to illuminate a prescribed segment of the illumination pattern, and the illumination pattern is formed by combining the segments illuminated by the individual light emitting elements.

6. The inverted pendulum vehicle according to claim 1, wherein the display unit is configured to illuminate the floor surface surrounding the vehicle body substantially over an entire periphery of the vehicle body.

7. The inverted pendulum vehicle according to claim 1, wherein the vehicle body is provided with a pair of footrests for a rider of the vehicle, and the display unit is provided on a lower surface of each footrest.

* * * * *